United States Patent [19]
Harter

[11] 3,742,983
[45] July 3, 1973

[54] VALVE ASSEMBLY HAVING INTEGRAL BODY AND INLET

[75] Inventor: Robert M. Harter, Collins, N.Y.

[73] Assignee: AVM Corporation, Jamestown, N.Y.

[22] Filed: Oct. 30, 1970

[21] Appl. No.: 85,618

[52] U.S. Cl. ............................ 137/625.47, 251/366
[51] Int. Cl. ............................................. F16k 11/00
[58] Field of Search ................ 137/625.47, 625.48; 251/310, 311, 312, 366

[56] References Cited
UNITED STATES PATENTS

| | | | |
|---|---|---|---|
| 1,050,150 | 1/1913 | Lockhart | 251/366 X |
| 1,854,051 | 4/1932 | McAndrew | 251/366 X |
| 3,674,238 | 7/1972 | Pickles et al. | 251/366 X |
| 3,506,239 | 4/1970 | Johnson | 251/340 |
| 1,320,627 | 11/1919 | Long | 137/625.47 X |
| 3,058,718 | 10/1962 | Johnson | 251/310 X |
| 2,973,181 | 2/1961 | Johnson | 251/310 X |
| 3,052,444 | 9/1962 | Kintner | 251/367 X |
| 3,116,756 | 1/1964 | Alderson | 251/367 X |
| 3,170,226 | 2/1965 | Larry | 251/367 X |
| 3,192,613 | 7/1965 | Allen | 251/367 X |
| 3,405,601 | 10/1968 | Clarke | 137/625.47 X |
| 3,430,918 | 3/1969 | Kolze | 251/367 X |

*Primary Examiner*—Samuel Scott
*Attorney*—Strauch, Nolan, Neale, Nies and Kurz

[57] ABSTRACT

A sheet metal plug valve assembly with a hollow tubular body having a lateral outlet opening and an axial inlet. The valve plug is a hollow member coaxially rotatable within the body between positions where it will block or permit flow through the body. The plug member has side and bottom openings which are aligned with the respective valve body openings in the valve open position. An outlet tube is secured to the body in alignment with the lateral body opening, and there is a seal between the inner end of the outlet tube and the periphery of the plug member. An inlet tube, coaxial with the body is an integral axial extension of the body below the bottom of said plug member. The valve assembly can be made with more than one outlet or more than one inlet.

5 Claims, 5 Drawing Figures

PATENTED JUL 3 1973
3,742,983
SHEET 1 OF 2
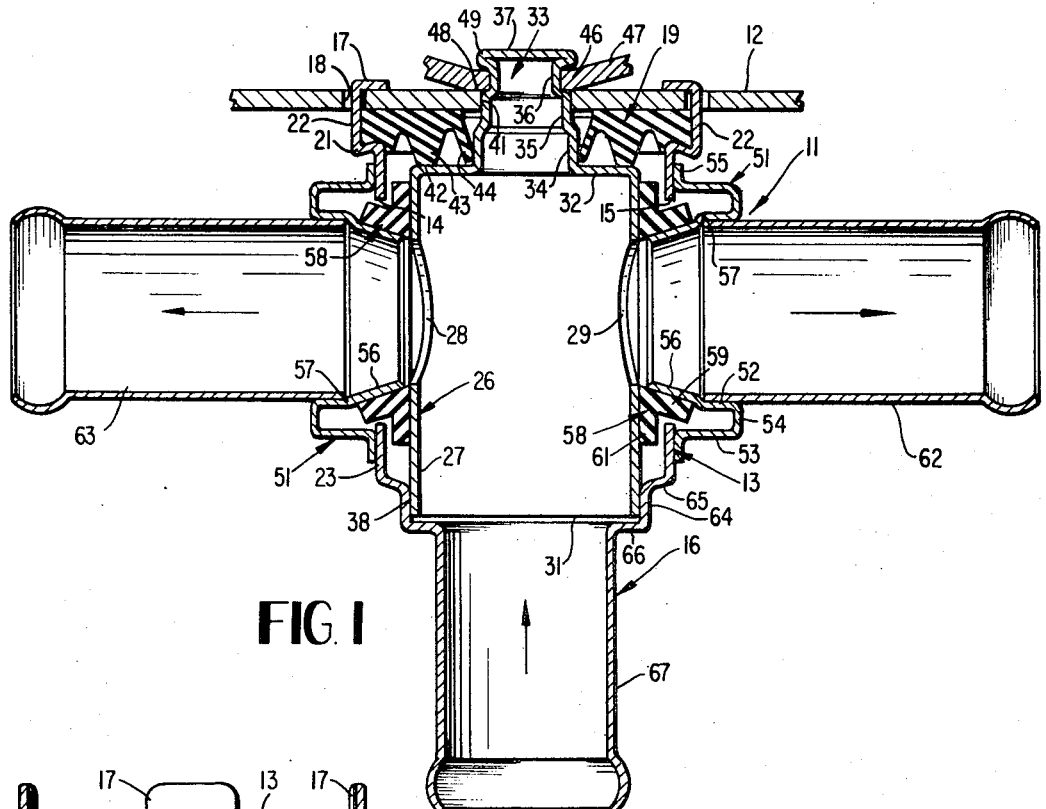
FIG. 1
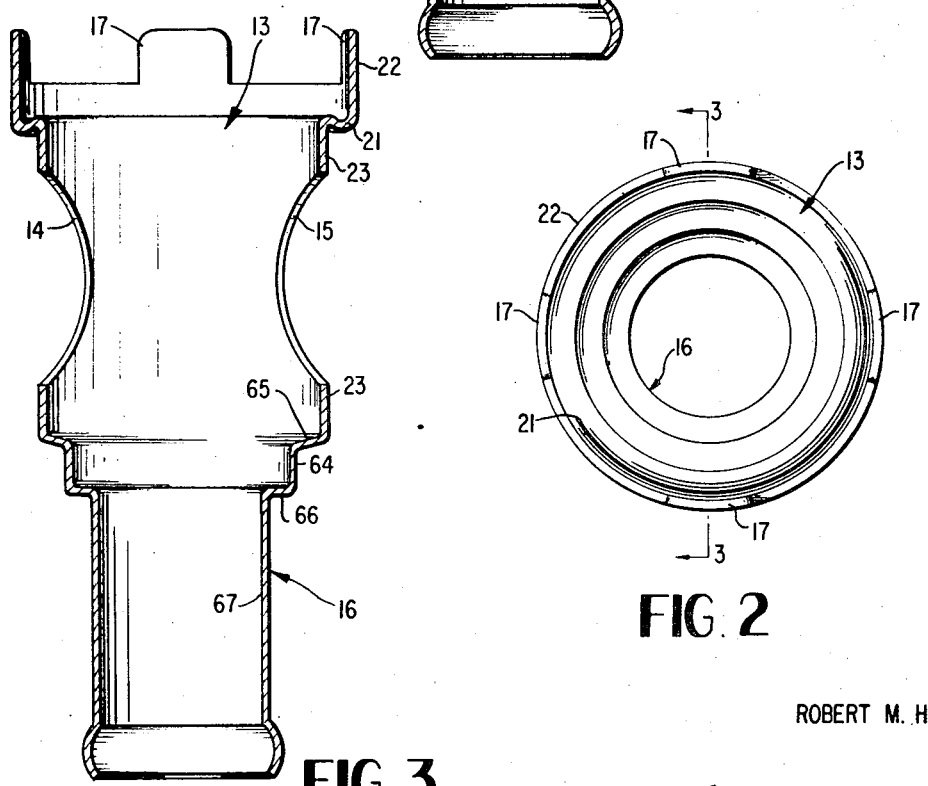
FIG. 2
FIG. 3
INVENTOR
ROBERT M. HARTER
BY Strauch, Nolan, Neale, Nies & Kurz
ATTORNEYS

PATENTED JUL 3 1973 3,742,983

INVENTOR
ROBERT M. HARTER

3,742,983

VALVE ASSEMBLY HAVING INTEGRAL BODY AND INLET

This invention relates to plug valves and particularly to valves having fabricated plugs and bodies. In its preferred embodiments the invention will be disclosed as an improvement over the plug valve assembly disclosed in U.S. Letters Patent No. 3,506,239 issued Apr. 14, 1970.

The present invention is concerned with a valve assembly of this type employing a novel one-piece integral body and inlet tube construction, and such is the major object of the invention.

Further objects of the invention include novel details of such construction wherein an inlet tube is coaxially united integrally with a valve body, the unit being fabricated from sheet metal. Other objects of the invention will appear in connection with the disclosure including the claims.

BRIEF DESCRIPTION OF DRAWINGS

FIG. 1 is a sectional view showing a valve assembly according to a preferred embodiment of the invention;

FIG. 2 is an end view of the one-piece valve body and inlet tube unit;

FIG. 3 is a section substantially on line 3—4 of FIG. 2;

PREFERRED EMBODIMENTS

Figure 4:
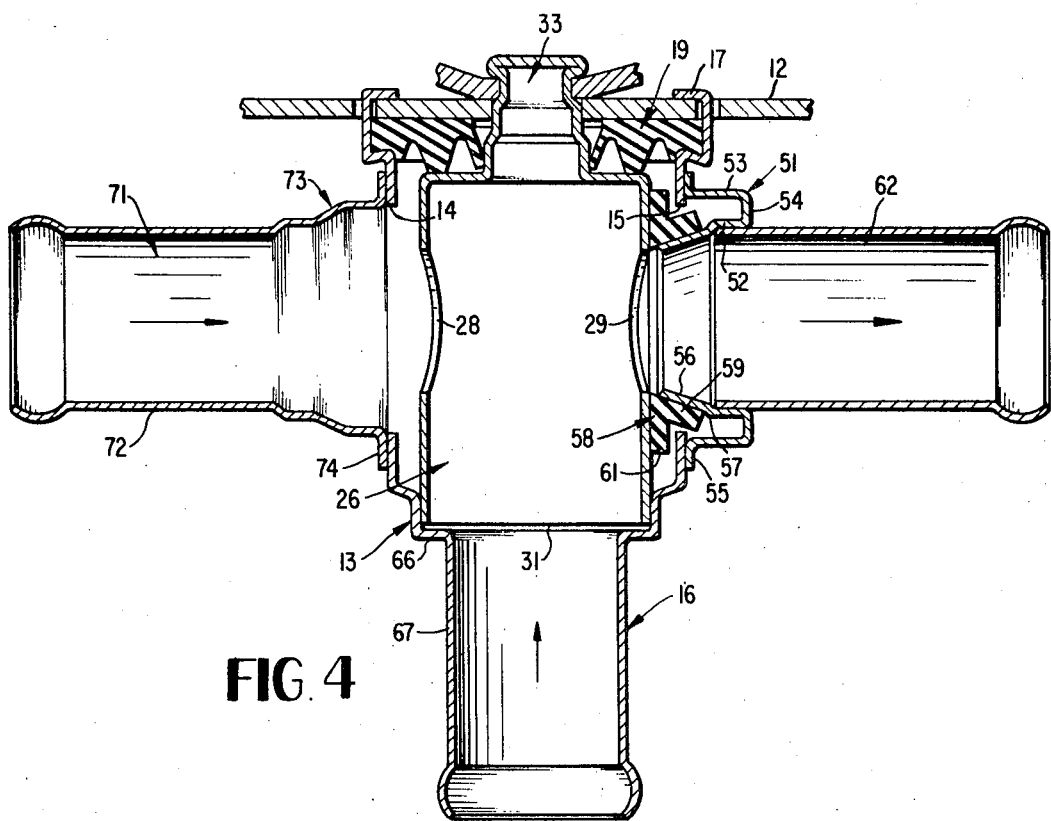
FIG. 4 is a sectional view like FIG. 1 but showing another embodiment having an integral inlet tube and saddle at one side of the body.

In the preferred embodiment of the invention the valve assembly 11 comprises a top plate 12 which serves as the cover for the open top of a hollow one-piece metal valve body and inlet tube unit 13 having diametrically opposed lateral fluid outlet openings 14 and 15 and formed at its lower end with an integral inlet tube section 16 which will be further described in more detail. Body 13 is suspended from plate 12 which also serves to mount the assembly in a desired location as by tabs 17 extending through plate apertures 18 and bent over onto the upper side of the plate.

A resilient annular stem seal 19 is compressed axially all around its outer periphery between the underside of plate 12 and a body shoulder 21 formed between the enlarged diameter upper end 22 of the valve body and a smaller diameter cylindrical portion 23 in which outlet openings 14 and 15 are formed. This forms a fluid tight seal between the upper end of body 13 and plate 12.

A one-piece valve plug and stem member 26 is rotatably mounted within body 13. Member 26 comprises a hollow open bottom, closed top shell 27 of formed sheet metal. It preferably is cylindrical and has aligned opposite side openings 28 and 29. Shell 27 is open at its lower end at 31.

The upper end of shell 27 is closed by annular transverse top wall 32 which extends at right angles to the plug axis and upstanding post 33 that is concentric and symetrical about the plug axis. Post 33 consists of successively reduced diameter portions 34, 35 and 36 and a transverse end wall 37 that extends across the portion 36.

Preferably the entire outer surface 38 of shell 27 is coated with polytetrafluoroethylene or equivalent corrosion and wear resistant plastic coating.

Integral valve stem 33 projects through the open center of resilient annulus 19 and an opening 41 in plate 12 which is of such diameter to slidably and rotatably accommodate stem portion 35.

The upper side of annulus 19 is flat and flush with the underside of plate 12. The flat annular end wall 32 of the shell bears slidably against the flat annular surface 42 on the lower end of a resilient integral annular rib 43 projecting from the lower side of the annulus. Inwardly of rib 43, the annulus is formed with another resilient integral annular rib 44 that is of such shape and size as to sealingly slidably surround stem portion 34 in the assembly.

During assembly of the valve, member 26 is inserted to thrust stem 33 through resilient rib 44 until wall 32 abuts rib 43 and stem portion 36 is disposed beyond plate opening 41. The apertured internally serrated hub 46 of an operating lever 47 is forced down onto stem portion 35 and pushed down until it abuts stem shoulder 48. Then the projecting upper end of the stem is deformed to the condition shown in full lines in FIG. 1 wherein the outer end of portion 36 and wall 37 are deformed and expanded to provide a ledge 49 extending over lever hub 46 to axially and non-rotatably fix lever 47 upon stem 33. This also fixes the location of member 26 in the assembly with openings 28 and 29 at the same level as the body side openings.

Plug valve member 26 and its mounting in the assembly are preferably as disclosed in copending application Ser. No. 4348 filed Jan. 20, 1970.

Annulus 19 is preferably of the same structure and function as disclosed and claimed in copending application Ser. No. 4347 filed Jan. 20, 1970.

Outlet tube mounting saddles in the form of integral metal members 51 are mounted on body 13 in surrounding relation to openings 14 and 15 respectively. Each saddle 51 is an integral annularelement of generally U-shape in radial section preferably stamped from a single sheet of metal and comprises inner and outer parallel cylindrical portions 52 and 53 joined at their outer ends by a bridge 54.

At its inner end, portion 53 is turned outwardly to form an annular flange 55 that conforms to the external contour of body 13 entirely around opening 14, and flange 55 is permanently secured to body 13 as by brazing or welding. This mounts saddles 51 rigidly on body 13.

Each saddle portion 52 is formed at its inner end with a reduced diameter inwardly converging tapered and preferably frusto-conical section 56 that projects within body 13 and terminates adjacent but free of the rotatable plug surface. The junction at the larger end of tapered section 56 forms an annular internal shoulder 57 that faces axially outwardly in the assembly.

A resilient sealing ring 58 is mounted on tapered section 56 on each saddle. As shown, ring 58 is generally L shaped in normal radial section with one resiliently stressed arm 59 snugly and resiliently surrounding the smooth tapered outer saddle surface at 56. The other resiliently stressed arm 61 of ring 58 engages plug shell 27 and its inner surface is shaped to conform snugly with the shell contour. Arm 59 may be bonded to tapered saddle section 56 so as to be fixed axially of the saddle. Arm 61 engages shell 27 with sufficient force to provide a fluid tight seal around the opening 28 when the valve is open, especially when backed with inlet fluid pressure, but it does not materially impede rotation of the plug.

One fluid outlet tube 62 extends snugly, usually with a press fit, within the cylindrical wall defined by portion 52 of one saddle until its end abuts shoulder 57 and tube 62 is suitably permanently secured to the saddle as by brazing or welding.

The other fluid outlet tube 63 has a press fit within and is surrounded by the cylindrical inner portion 52 of the other saddle, and its inner end abuts saddle shoulder 57. The saddle and outlet tube structures at opposite sides of the body are thus preferably identical.

The foregoing saddle and resilient seal arrangement at the side openings may preferably be the same as disclosed in U.S. Letters Pat. No. 3,506,239 issued Apr. 14, 1970 to which reference may be had for further detail.

As shown in FIGS. 1 and 3, body 13 at the inlet section has a reduced diameter cylindrical lower boss 64 that is integrally united with body portion 23 by a radial shoulder 65, and boss 64, is integrally united by a radial shoulder 66 with the end of inlet tube 67. The lower open end of shell 27 extends within the space defined by boss 64 to terminate just above shoulder 66. FIGS. 2 and 3 show the integral body and inlet tube unit apart from the assembly.

FIG. 4 shows an embodiment which is like FIGS. 1-3 except that there are two inlets, the outlet 63 being replaced by a one-piece inlet tube unit indicated at 71. Inlet tube unit 71 consists of a cylindrical tube 72 and an enlarged flared inner end saddle region 73 terminating in an annular flange 74 shaped with an axially directed concave surface adapted to conform to the contour of body 13 and secured rigidly around body opening 14 as by brazing. This inlet tube unit may be the same as disclosed in copending application Ser. No. 85,570 now U.S. Pat. No. 3,704,003 filed of even date herewith and entitled VALVE ASSEMBLY WITH INTEGRAL INLET TUBE AND SADDLE.

Figure 5:
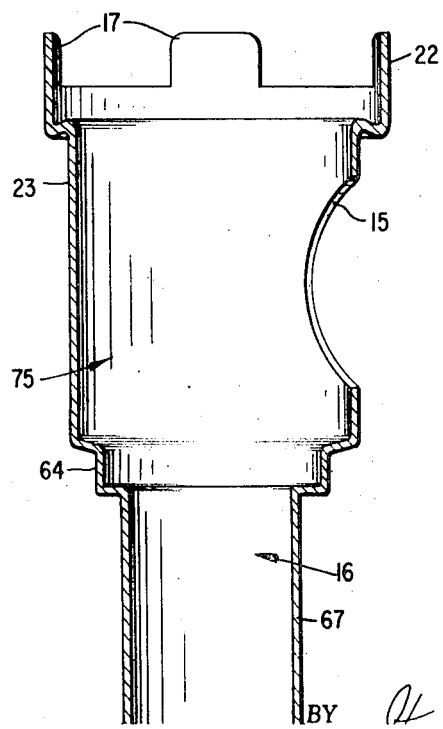
FIG. 5 is a view like FIG. 3 but showing another embodiment of the one-piece valve body.

FIG. 5 shows an alternative integral body and inlet tube unit 75 which is the same as body 13 but has only one outlet opening 15 in the body. Unit 75 is assembled with the hollow plug member as shown in FIG. 1.

I claim:

1. A plug valve assembly comprising a one-piece valve body and inlet tube unit constructed from sheet metal and including a hollow tubular body and an inlet tube, said body having a lateral outlet opening and an axial inlet opening, a hollow plug member coaxially rotatable within said body between positions where it blocks or permits flow through said openings, said plug member having side and bottom openings adapted to align with the respective valve body openings in the valve open position, an outlet tube secured to said body in alignment with said lateral opening, means providing an annular seal between the inner end of said outlet tube and the periphery of said plug member, said inlet tube being coaxial with said body and being formed in one-piece with said body as an integral axial extension of said body below the bottom of said plug member.

2. The plug valve assembly defined in claim 1, wherein said plug member is a cylinder of smaller diameter than said body, said body is formed with a reduced diameter region within which the lower end of said plug member is guidingly received, and said inlet tube is further reduced in diameter as compared to said region and integral with a radial shoulder connecting it to the lower end of said region.

3. The plug valve assembly defined in claim 1, wherein said body is formed with a second lateral outlet opening and said plug member is formed with a second side opening adapted to align with said second lateral body opening in the open position of the valve, a second outlet tube is secured to said body in alignment with said second lateral opening and an annular seal is provided between the inner end of said second outlet tube and the periphery of said plug member.

4. The plug valve assembly defined in claim 1, wherein said body is formed with a lateral inlet opening, said plug member is formed with a side opening adapted to align with said lateral inlet opening in the open position of the valve, and an inlet tube having an inner end shaped to the contour of said body is secured directly to said body around said lateral inlet opening.

5. The plug valve assembly defined in claim 4, wherein the inner end of said inlet tube is an integral saddle section of increased diameter terminating in an attachment flange axially shaped with a concave surface conforming to the body surface contour.

* * * * *